Jan. 16, 1968  L. R. TEEPLE, JR  3,363,525
PHOTOGRAPHY OF SPECTRAL DISPERSION
Filed Feb. 17, 1964  2 Sheets-Sheet 1
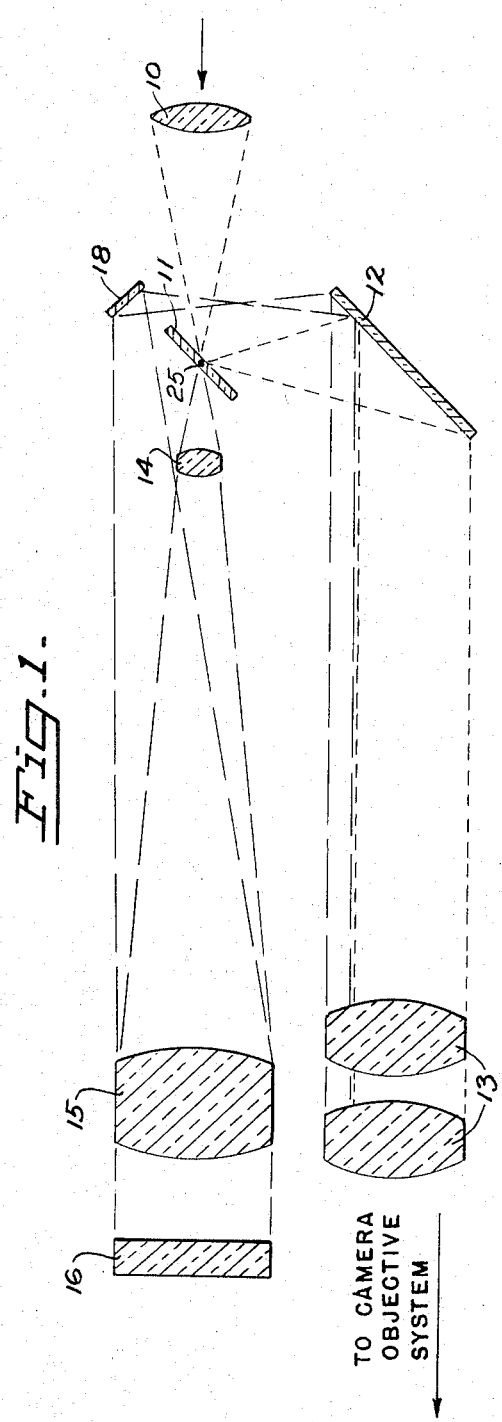
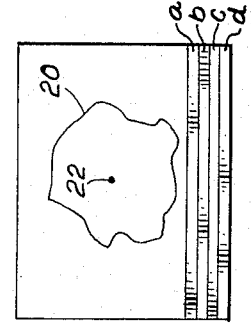
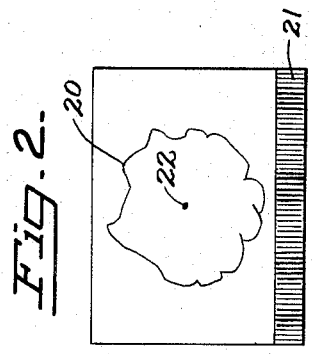
INVENTOR.
LAWRENCE R. TEEPLE, JR.
BY
*Fryer & Tjensvold*
ATTORNEYS

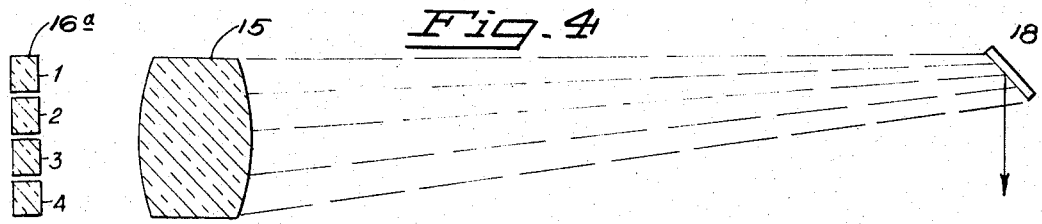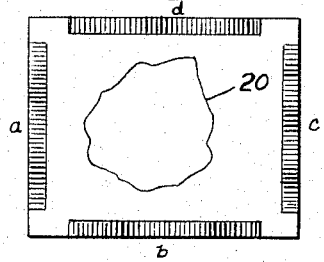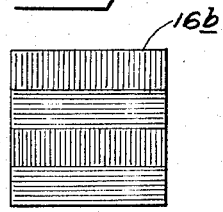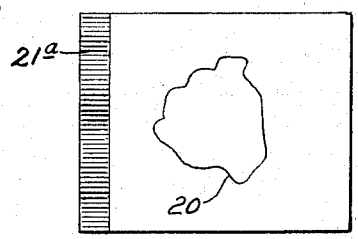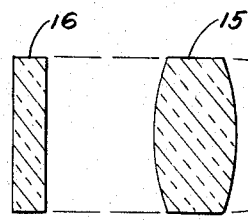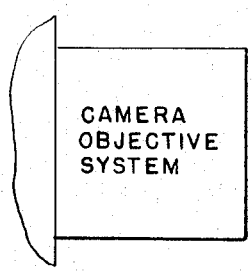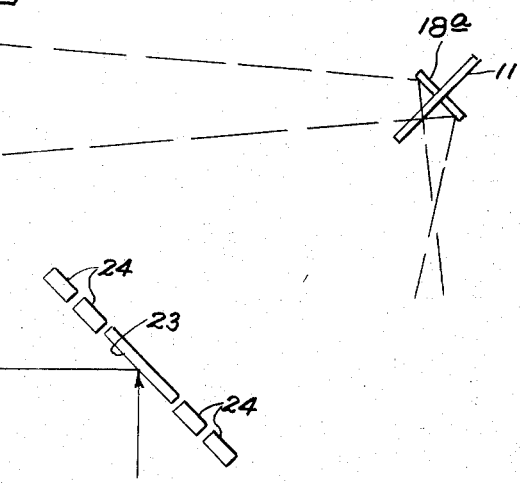

United States Patent Office 3,363,525
Patented Jan. 16, 1968

3,363,525
PHOTOGRAPHY OF SPECTRAL DISPERSION
Lawrence R. Teeple, Jr., Palo Alto, Calif., assignor to Beckman & Whitley, Inc., San Carlos, Calif., a corporation of Delaware
Filed Feb. 17, 1964, Ser. No. 345,494
5 Claims. (Cl. 95—1.1)

ABSTRACT OF THE DISCLOSURE

An apparatus for producing a photographic record of a luminous event and a photographic record of a spectral dispersion of the same event simultaneously upon a single film with particular reference to the disposition of the two records being such that there is a minimum of interference of each record with the other.

---

This invention relates to the art of photography in which a photographic record of a luminous event and a photographic record of a spectral dispersion of the same event are produced simultaneously.

In my copending application entitled, "Spectral Dispersion Attachment for Cameras," Ser. No. 340,455, filed Jan. 27, 1964 now U.S. Patent No. 3,260,180, apparatus is disclosed for producing a spectrogram from the light of a luminous event on the same film and at the same time that an ordinary photographic record is being made. The apparatus of said application has proven extremely valuable in the analysis of luminous events such as the firing of a vacuum tube and of various pyrophoric events.

The apparatus has some limitations, however, in that the spectrogram is produced centrally of the frame so that in effect it overlies or conceals a part of the photographic record of the event. The spectrogram is also limited in length by the size of the frame so that it has limited range.

It is an object of the present invention to provide apparatus for the photography of spectral dispersion which overcomes the above-mentioned limitations and to provide means for simultaneously recording an event and a spectral dispersion of a sample of light from said event with the resulting spectrogram arranged marginally of the photographic record to avoid obscuring the record.

Another object of the invention is to provide means to produce a spectrogram having a long range and high resolution in a limited space or frame.

Further and more specific objects and advantages of the invention and the manner in which the invention is carried into practice are made apparent in the following specification by reference to the accompanying drawings.

In the drawings:

FIG. 1 is a diagrammatic view illustrating the optical elements of a spectrographic unit embodying the present invention;

FIG. 2 represents a photographic record of an event and a spectrographic dispersion produced with the arrangement illustrated in FIG. 1;

FIG. 3 represents a record like FIG. 2 with an enlarged spectrogram having greater resolution;

FIG. 4 is a diagram of a modification of the optics illustrated in FIG. 1 employed in producing the record shown in FIG. 3;

FIG. 5 represents another photographic record with a different arrangement of a spectrogram thereon;

FIG. 6 is a view in front elevation of a set of dispersion gratings employed in making the record shown in FIG. 5;

FIG. 7 shows a further modification of a record;

FIG. 8 is a schematic illustration of the modified optics employed in making the record of FIG. 7; and FIG. 9 is a schematic view of optics employed in the production of a photographic record and spectrogram of an event which produces parallel light such as a stellar body or other luminous object at a very great distance.

In the drawings, the path of the image of the event being recorded is shown in dotted lines and the path of the image of the spectral dispersion is shown in broken lines.

Referring first to FIG. 1, light from the object passes through an objective lens 10 and is reflected by a mirror 11 and a mirror 12 through a pair of relay lenses 13 and then into the objective system of a camera (not shown). It is to be understood that the optical system schematically shown in FIG. 1 will be mounted in a housing capable of attachment to any camera with which it is to be used.

A spectral dispersion is made from a sample or pencil of light from the event which light is allowed to pass through a pin hole 25 in the reflecting surface of the mirror 11 and through a lens 14 and then a collimating and collecting lens 15 so that the collimated light strikes a dispersion grating 16. The dispersion grating is tilted slightly to direct an image of the dispersion back to a small mirror 18 which reflects to the upper marginal edge of the mirror 12 and thence into the camera, which is not shown, to produce the record shown in FIG. 2 in the form of a photographic film with the event recorded shown at 20 and a spectrogram at 21 which represents a dispersion of the light which passed through the pin hole recorded on the film at 22. This record of the pin hole serves to indicate the exact point of the object or event at which the spectrum was analyzed.

FIG. 3 illustrates the results of a modified form of the invention designed to produce an enlarged and more highly resolved spectrogram. As shown in FIG. 3, the spectrogram is provided in four separate bands a, b, c and d and this is accomplished with the modified optics shown in FIG. 4 wherein a group of gratings is shown at 16a in place of the grating 16 in FIG. 1 while the collimating lens 15 and mirror 18 are the same as shown in FIG. 1 as are all of the other components. In this modification, each of the gratings 16a is designed for best performance within a given range of light waves. For example, the gratings may be blazed in accordance with the following table.

| Grating No.: | Angstroms |
| --- | --- |
| 1 | 3800 to 4600 |
| 2 | 4600 to 5400 |
| 3 | 5400 to 6200 |
| 4 | 6200 to 7000 |

Thus each grating is designed for a part of the range of the visible spectrum and each grating is adjusted to cause a reflection of that part to be cast upon the mirror 18 from which it is in turn reflected onto the mirror 12 shown in FIG. 1 to produce the record of FIG. 3 wherein a highly resolved image of the spectral dispersion is produced.

FIG. 5 shows a record in which a spectrogram in four sections similar to that of FIG. 3 is disposed at the four edges of the frame containing the record of the event. This is accomplished by an arrangement of gratings shown in FIG. 6. In this figure four gratings shown at 16b are blazed alternately at right angles to each other so that the spectral lines will be right angularly arranged to accommodate the disposition of the four part spectrogram of FIG. 5. The gratings 16b are of course angularly disposed or it might be said aimed to produce this rectangular arrangement on the mirror 18 to be reflected in turn to the mirror 12 of FIG. 1 and thence into the camera.

In some cases the particular shape of the frame in the camera will call for an arrangement of the spectrogram 21a of FIG. 7 at the narrow portion of the frame rather than wide portions as in FIG. 2 and this is readily accomplished by rearranging the mirror 18 to assume the position 18a as shown in FIG. 8 where it is offset to one side of the mirror 11.

A simplified form of the invention may be employed where the illumination under scrutiny is from a point source such as a star or other luminous object at a very great distance so that the light therefrom may be considered as parallel or collimated light. The device for producing an image of such an object and simultaneously a spectrogram of light therefrom is schematically illustrated in FIG. 9 as comprising a mirror 23 and four gratings 24 all of which reflect parallel light from the image into the objective system of the camera. In this case, the gratings may, as previously described, be blazed and disposed to produce different results on the record such for example as are illustarted in FIGS. 3 and 5.

I claim:

1. An optical device for directing an image of an event to be recorded on camera film into a camera objective system together with an image of a spectral dispersion of light from the same event comprising first and second mirrors angularly related to receive light from the event and reflect it into the objective system of the camera, said first mirror having a small opening through which a pencil of light from said event passes, means in the path of said pencil of light to produce a dispersion thereof, a third mirror oriented to reflect an image of the spectrum produced by said dispersion onto a marginal edge of said second mirror to be directed thereby into the camera objective system at such an angle to produce an image of said spectrum on a margin of said camera film.

2. The device of claim 1 in which the dispersion producing means comprises a plurality of dispersion gratings arranged to produce an enlarged spectrogram consisting of a plurality of parallel bands on the film margin.

3. The device of claim 2 in which the gratings are blazed for best resolution in different wave length bands in the visible spectrum.

4. The device of claim 2 with four dispersion gratings of which two are blazed at right angles to the other two to produce a spectrogram consisting of four parts to be formed on the four marginal edges of a rectangular film frame.

5. A device for producing simultaneously a photographic record of a luminous object and a record of a spectral dispersion of light from said object on the same film frame comprising a mirror for directing light from the object to the objective system of a camera, and a plurality of special gratings oriented with respect to the mirror to create spectral dispersions of the light from the luminous object and direct same to the same frame and marginally of the record of the object.

References Cited
UNITED STATES PATENTS

| | | | |
|---|---|---|---|
| 2,891,439 | 6/1959 | Lee | 352—236 X |
| 3,062,089 | 11/1962 | Martin | 88—1 X |
| 3,260,180 | 7/1966 | Teeple | 95—1.1 |

JEWELL H. PEDERSEN, *Primary Examiner.*

F. L. EVANS, *Assistant Examiner.*